United States Patent
Ikegaya et al.

(10) Patent No.: US 12,363,362 B2
(45) Date of Patent: Jul. 15, 2025

(54) COMMUNICATION SYSTEM, COMMUNICATION METHOD, SERVER, CLIENT TERMINAL, AND PROGRAM

(71) Applicant: Nippon Telegraph and Telephone Corporation, Tokyo (JP)

(72) Inventors: Mizuki Ikegaya, Musashino (JP); Kei Fujimoto, Musashino (JP); Shogo Saito, Musashino (JP); Tetsuro Nakamura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 12 days.

(21) Appl. No.: 18/283,409

(22) PCT Filed: Mar. 22, 2021

(86) PCT No.: PCT/JP2021/011614
§ 371 (c)(1),
(2) Date: Sep. 21, 2023

(87) PCT Pub. No.: WO2022/201221
PCT Pub. Date: Sep. 29, 2022

(65) Prior Publication Data
US 2024/0098318 A1     Mar. 21, 2024

(51) Int. Cl.
*H04N 21/238*     (2011.01)
*H04N 21/24*      (2011.01)
*H04N 21/434*     (2011.01)

(52) U.S. Cl.
CPC ....... *H04N 21/238* (2013.01); *H04N 21/2407* (2013.01); *H04N 21/434* (2013.01)

(58) Field of Classification Search
CPC . H04N 21/238; H04N 21/2407; H04N 21/434
(Continued)

(56) References Cited

U.S. PATENT DOCUMENTS

| 2013/0322246 A1* | 12/2013 | Zhou | H04L 47/27 |
| | | | 370/235 |
| 2015/0150062 A1* | 5/2015 | Guerrera | H04N 21/4331 |
| | | | 725/95 |

(Continued)

OTHER PUBLICATIONS

Developer.oculus.com [online], "How does Oculus Link Work? The Architecture, Pipeline and AADT Explained," Nov. 22, 2019, retrieved on Aug. 31, 2023, retrieved from URL<https://developer.oculus.com/blog/how-does-oculus-link-work-the-architecture-pipeline-and-aadt-explained/>, 10 pages.

(Continued)

*Primary Examiner* — Benjamin R Bruckart
*Assistant Examiner* — Alexander Boyd
(74) *Attorney, Agent, or Firm* — Fish & Richardson P.C.

(57) ABSTRACT

A communication system in which a server-side system and a client-side system are communicably connected via a network, the server-side system including: an information reception unit that receives an input information packet including input information and loss chunk numbers from the client-side system; a video processing unit that generates video data; a chunking function unit that chunks the video data and assigns a number to each chunk; a chunk loss determination unit that calculates a chunk loss rate and determines a transmission interval on the basis of a transmission interval determination logic; and a transmission control unit that transmits the chunked video data to the client-side system.

5 Claims, 7 Drawing Sheets

(58) Field of Classification Search
USPC .............................................................. 725/9
See application file for complete search history.

(56) References Cited

U.S. PATENT DOCUMENTS

| | | | | |
|---|---|---|---|---|
| 2015/0271255 | A1* | 9/2015 | Mackay | H04L 47/6275 |
| | | | | 709/226 |
| 2016/0323062 | A1* | 11/2016 | Yang | H04N 21/4348 |
| 2017/0127147 | A1* | 5/2017 | Crabtree | H04N 21/8456 |
| 2023/0353284 | A1* | 11/2023 | Dong | H04L 47/11 |

OTHER PUBLICATIONS

Moguravr.com [online], "'Oculus Link' Connecting Quest and PC: Surprisingly comfortable," Sep. 30, 2019, retrieved on Aug. 31, 2023, retrieved from URL<https://www.moguravr.com/oculus-link-report/>, 19 pages (with English translation).

* cited by examiner

COMMUNICATION SYSTEM, COMMUNICATION METHOD, SERVER, CLIENT TERMINAL, AND PROGRAM

CROSS-REFERENCE TO RELATED APPLICATIONS

This application is a National Stage application under 35 U.S.C. § 371 of International Application No. PCT/JP2021/011614, having an International Filing Date of Mar. 22, 2021.

The disclosure of the prior application is considered part of the disclosure of this application, and is incorporated by reference in its entirety into this application.

TECHNICAL FIELD

The present invention relates to a communication system, a communication method, a server, a client terminal, and a program that offload high-load processing to a remote server in a network.

BACKGROUND ART

In a conventional communication system, for example, if virtual reality (VR) is described as a use case, a head mounted display (HMD) transmits input information such as line-of-sight information to a personal computer (PC) of an end user via a USB-C cable or the like, and rendering processing and encoding processing are executed in the PC. In addition, a method of transmitting video information from the PC to the HMD using the USB-C or the like again is used (see Non Patent Literatures 1 and 2).

CITATION LIST

Non Patent Literature

Non Patent Literature 1: Shun Kubota, "'Oculus Link' connecting Quest and PC, surprisingly comfortable", [online], Mogura V R, Sep. 30, 2019, [searched on Mar. 5, 2021], Internet <URL:https://www.moguravr.com/oculus-link-report/>

Non Patent Literature 2: Volga Aksoy, et al., "How does Oculus Link Work? The Architecture, Pipeline and AADT Explained," [online], Oculus Gelistirici Blogu, Nov. 22, 2019, [searched on Mar. 5, 2021], Internet <https://developer.oculus.com/blog/how-does-oculus-link-work-the-architecture-pipeline-and-aadt-explained/?locale=tr_TR>

SUMMARY OF INVENTION

Technical Problem

For VR viewing in the communication system described above, a video in the line-of-sight direction is rendered in real time to be drawn on the basis of the line-of-sight information measured by the HMD. At this time, the calculation amount of the processing is large, and a high-performance processor or a dedicated accelerator (for example, a graphics processing unit (GPU) or the like) is required.

That is, in a case in which a user intends to use the above system, a method is adopted in which, in a client system provided on the user side, a PC or a stationary game machine equipped with a high-performance processor or a dedicated accelerator (GPU or the like) is prepared and arranged in a user's home, media processing having a large processing load is operated with an assistance of a machine power of the high-performance processor or the dedicated accelerator, and an operation result is projected on the HMD side.

The present invention has been made in view of such a point, and an object of the present invention is to reduce a processing load of a client system and to eliminate need to provide a high-performance processor or a dedicated accelerator on the user side.

Solution to Problem

A communication system according to an embodiment of the present invention is a communication system in which a server-side system and a client-side system are communicably connected via a network, the server-side system including: an information reception unit that receives, from the client-side system, an input information packet including input information for rendering and loss chunk numbers, which are numbers of lost chunks from chunked video data; a video processing unit that performs video rendering processing according to the received input information to generate video data; a chunking function unit that chunks the generated video data according to a size of a maximum transmission unit (MTU) and assigns a number to each of chunks indicating the chunked video data; a chunk loss determination unit that calculates a chunk loss rate by use of a quantity of packets with which the chunked video data is transmitted and a total quantity of the lost chunks indicated by the loss chunk numbers, and determines a transmission interval of the packets including the chunked video data on a basis of a predetermined transmission interval determination logic for determining the transmission interval by comparing the calculated chunk loss rate with a preset maximum allowable chunk loss rate; and a transmission control unit that transmits each of the packets including the chunked video data to the client-side system at the determined transmission interval, the client-side system including: an input information acquisition unit that acquires the input information; a chunk processing unit that receives each of the packets including the chunked video data from the server-side system and extracts the loss chunk numbers of the chunks included in a lost packet; a data output unit that decodes and outputs the video data by use of each chunk of the received chunked video data; and an input information transmission unit that transmits the input information packet including the input information and the extracted loss chunk numbers to the server-side system.

Advantageous Effects of Embodiment

According to the embodiment of the present invention, it is possible to reduce a processing load of a client system and to eliminate need to provide a high-performance processor or a dedicated accelerator on the user side.

DESCRIPTION OF EMBODIMENTS

Next, a mode for carrying out the present invention (hereinafter referred to as "embodiment") is described. First, an outline of the embodiment is described.

<Outline>

A communication system according to the present embodiment (see FIG. 1 described later) acquires, for example, input information such as a line of sight in an HMD from a client in a user's home ("client-side system 20" in FIG. 1 described below) via a network (NW), performs video rendering processing on a server ("server-side system 10" in FIG. 1 described below) in a remote location such as a data center (DC), and transmits video data to the client via the NW. This system reduces power consumption and a calculation load on the client side.

Note that the client may be configured with only a dedicated terminal such as an HMD, or may be configured with a system including a dedicated terminal such as an HMD and a PC connected to the dedicated terminal.

When the video data is exchanged between the client and the server via the NW, a data delay caused by encoding/decoding processing or the like becomes a problem. In order to solve this problem, this communication system uses uncompressed video data for NW communication. Specifically, the video data is cut into pieces (chunks) for each frame according to a maximum transmission unit (MTU), which is a maximum data size that can be transmitted at one time via the NW. These pieces of data are referred to as chunks, and in the present communication system, a transmission interval of the chunks is controlled according to a chunk loss rate of the video data, so that occurrence of a chunk loss or a delay is suppressed.

Hereinafter, the communication system of the present invention is described.

EMBODIMENT

Figure 1:
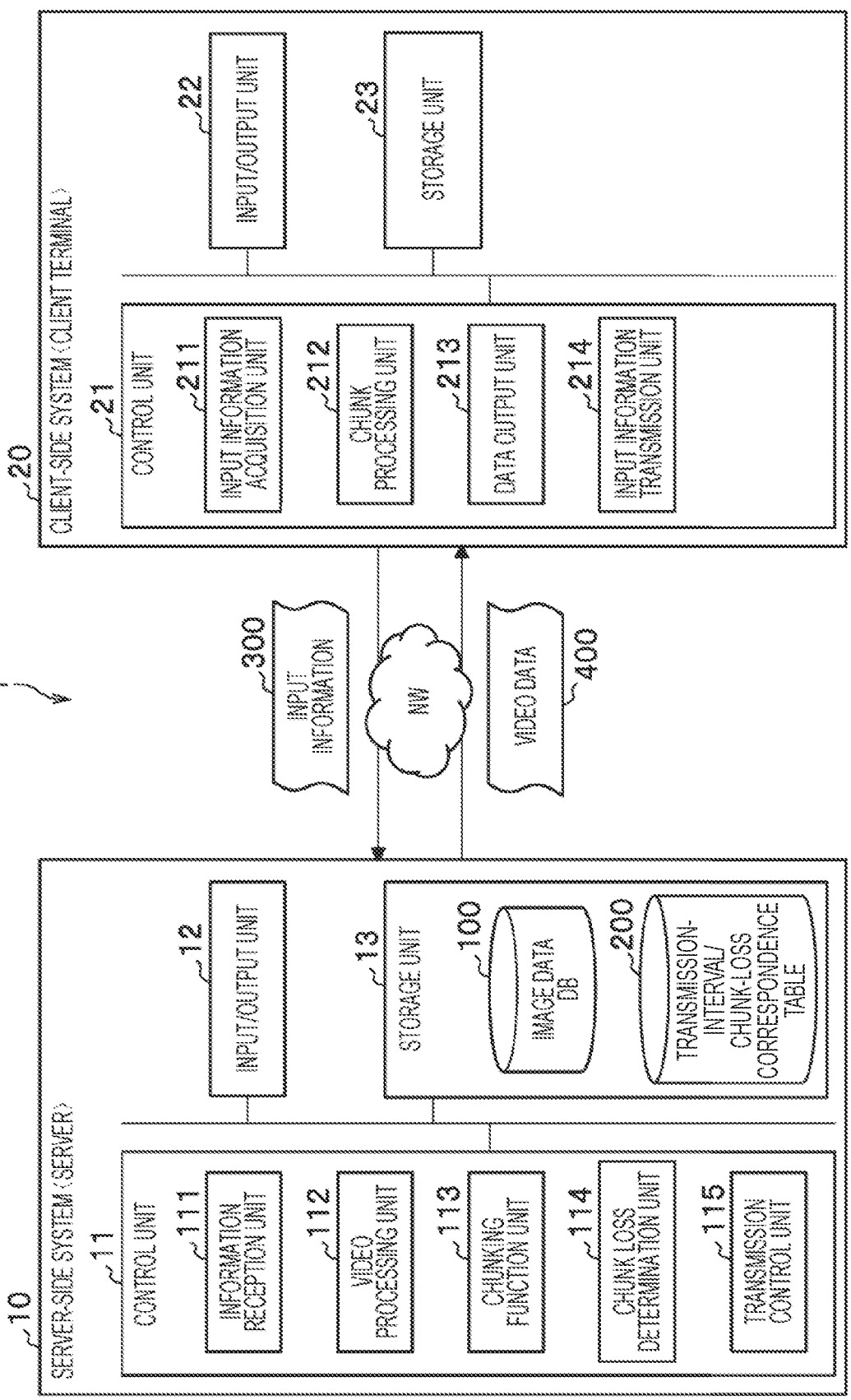
FIG. 1 is a diagram illustrating an overall configuration of a communication system according to an embodiment.

FIG. 1 is a diagram illustrating an overall configuration of a communication system 1 according to an embodiment.

As illustrated in FIG. 1, the communication system 1 according to the present embodiment includes the server-side system 10 and the client-side system 20, which are communicably connected via the NW.

As described above, the client-side system 20 may be configured only with a dedicated terminal such as an HMD, or may be configured with a system including a dedicated terminal such as an HMD and a PC connected to the dedicated terminal. However, in the following, the client-side system 20 is described as the client terminal 20 as a dedicated terminal.

The client terminal 20 has a function of transmitting, for example, input information 300 such as a line of sight in an HMD to the server 10 via the NW to acquire video data 400, which is a result of rendering processing performed on the server side, and displaying the video data 400 on a display device such as a display.

The server-side system 10 includes one or more servers in a data center (DC). Note that functional units in a control unit 11 described below may be included in separate servers so that the server-side system 10 may be configured as a system including a plurality of servers, but in the following description, it is assumed that all the functional units are included in the server 10 as one housing.

The server 10 acquires the input information 300 such as a line of sight from the client-side system (client terminal) 20, performs video rendering processing according to the input information 300 to generate video data, and transmits the video data to the client-side system (client terminal) 20 via the NW. At this time, the server 10 chunks the video data 400, controls (determines) a transmission interval of packets, and then transmits the packets to the client-side system (client terminal) 20.

As described above, the communication system 1 can reduce power consumption and a calculation load of the client-side system (client terminal) 20 by performing rendering processing and the like in the server-side system (server) 10. In addition, by controlling the transmission interval of the packets to which the chunked video data 400 is added, the communication system 1 can avoid a packet loss, a NW delay, and a decrease in throughput due to occurrence of burst traffic caused by a large data size in a case in which the video data is transmitted without compression.

The server-side system (server) 10 and the client-side system (client terminal) 20 included in the communication system 1 is specifically described below.

<<Server-Side System (Server)>>

The server 10 according to the present embodiment is described with reference to FIG. 1.

The server 10 acquires the input information 300 such as a line of sight from the client terminal 20, performs video rendering processing according to the input information 300 to generate the video data 400. The server 10 then chunks the generated video data 400, determines a packet transmission interval on the basis of predetermined logic related to a chunk loss rate, and transmits packets to the client terminal 20.

The server 10 includes the control unit 11, an input/output unit 12, and a storage unit 13.

The input/output unit 12 inputs and outputs information to and from the client terminal 20, another device, or the like. For example, the input/output unit 12 receives a packet that includes the input information 300 from the client terminal 20, and transmits packets that include the chunked video data 400.

The input/output unit 12 includes a communication interface that transmits and receives information via a communication line (NW), and an input/output interface that inputs information from an input device such as a keyboard (not illustrated) and outputs information to an output device such as a monitor (not illustrated).

The storage unit 13 includes a hard disk, a flash memory, a random access memory (RAM), or the like.

The storage unit 13 stores an image data database (DB) 100 and transmission-interval/chunk-loss correspondence table 200.

For example, in a case in which the client terminal 20 is an HMD, the image data DB 100 stores image data serving as a material of a video to be displayed on a display.

The transmission-interval/chunk-loss correspondence table 200 is information indicating the chunk loss rates each associated with a transmission interval of the packets to which the chunked video data 400 is added, and details thereof is described later with reference to FIG. 2.

Furthermore, the storage unit 13 temporarily stores a program for causing each functional unit of the control unit 11 to operate and information necessary for processing performed by the control unit 11.

The control unit 11 supervises overall processing executed by the server 10, and includes an information reception unit 111, a video processing unit 112, a chunking function unit 113, a chunk loss determination unit 114, and a transmission control unit 115.

The information reception unit 111 receives, from the client terminal 20, the packet to which the input information 300 for rendering is added (hereinafter, referred to as an "input information packet"). There are a case in which only the input information 300 is included in the input information packet and a case in which chunk numbers of lost chunks (hereinafter, referred to as "loss chunk numbers") are added together with the input information 300 (details are described below).

Note that the case in which the input information packet includes only the input information 300 and no loss chunk numbers are added includes an initial time and a case in which there is no packet loss.

The information reception unit 111 outputs the input information 300 added to the received input information packet to the video processing unit 112. Furthermore, in a case in which the loss chunk numbers are added to the input information packet, the information reception unit 111 outputs information on the loss chunk numbers to the chunk loss determination unit 114.

The video processing unit 112 refers to the image data DB 100 in the storage unit 13 on the basis of the input information 300 received by the information reception unit 111, performs video rendering processing according to the input information 300 to generate the video data 400.

The video processing unit 112 then outputs the generated video data 400 to the chunking function unit 113.

The chunking function unit 113 performs chunking processing according to a size of an MTU on the video data 400 acquired from the video processing unit 112. Note that the number of frames per second (for example, 60 frames per second (fps)) of the video data 400 is determined by preset FPS, and that the chunking function unit 113 performs chunking according to the MTU for each frame.

The chunking function unit 113 then assigns a chunk number to data of each chunk after chunking. The chunk numbers are assigned with regularity set in advance such that the original video data 400 can be restored by arranging the chunks in numerical order.

The chunk loss determination unit 114 calculates a chunk loss rate on the basis of the loss chunk numbers acquired from the information reception unit 111 and the number of packets counted by the transmission control unit 115 when the chunked video data 400 is transmitted to the client terminal 20. Specifically, the chunk loss determination unit 114 calculates the chunk loss rate by dividing the total quantity of lost chunks indicated by the loss chunk numbers by the number of packets counted at the time of transmission.

The chunk loss determination unit 114 then stores the calculated chunk loss rate in the transmission-interval/chunk-loss correspondence table 200 (FIG. 2) in the storage unit 13 in association with the transmission interval of the packets when the transmission control unit 115 counts the transmitted packets.

Furthermore, the chunk loss determination unit 114 determines a packet transmission interval at which the chunked video data 400 is transmitted by using a predetermined logic (hereinafter, referred to as a "transmission interval determination logic") based on the calculated chunk loss rate.

Note that, as a premise, when the transmission interval is determined on the basis of the transmission interval determination logic, a maximum allowable chunk loss rate is set in advance in the chunk loss determination unit 114 by, for example, an administrator of the communication system 1. In addition, the chunk loss determination unit 114 receives information indicating a congestion occurrence state in the NW (congestion information) from a network monitoring device or the like, thereby being able to grasp the congestion occurrence state in the NW.

Hereinafter, the transmission interval determination logic is described in detail.

(A) During Initial Operation of System and in Normal State (No Congestion in NW)

During an initial operation of the system and in a normal state indicating that no congestion is occurring in the NW, the chunk loss determination unit 114 determines the packet transmission interval on the basis of the following [Logic A]. Note that the chunk loss determination unit 114 determines the normal state, for example based on a fact that no congestion information of the NW is not received. Furthermore, when determining the packet transmission interval at the initial time (first time), the chunk loss determination unit 114 transmits the packets at a predetermined initial packet transmission interval set in advance.

[Logic A]

Chunk loss rate (R_LOSS)>maximum allowable chunk loss rate (MAX_LOSS)

In this case, the packet transmission interval is lengthened by a predetermined constant (a1: first constant).

Chunk loss rate (R_LOSS)<maximum allowable chunk loss rate (MAX_LOSS)

In this case, the packet transmission interval is shortened by a predetermined constant (a2: second constant).

Note that the predetermined constants (a1 and a2) may be the same value.

In [Logic A], in a case in which the chunk loss rate calculated by the chunk loss determination unit 114 exceeds the maximum allowable chunk loss rate, control is performed to lengthen the packet transmission interval such that the chunk loss rate falls within the maximum allowable chunk loss rate or less. On the other hand, if the chunk loss rate is smaller than the maximum allowable chunk loss rate, control is performed to shorten the packet transmission interval such that video display is not delayed on the client side due to continuation of the state.

(B) When Congestion Occurs in NW

When congestion is occurring in the NW, the chunk loss determination unit 114 determines the packet transmission interval on the basis of the following [Logic B]. Note that the chunk loss determination unit 114 determines that congestion is occurring in the NW, for example, while the congestion information is being received from a management device or the like of the NW. Furthermore, the chunk loss determination unit 114 determines that the congestion state continues, for example, while the congestion information is received at a predetermined time interval, and determines that the congestion state is resolved and the state has returned to the normal state if the reception of the congestion information at the predetermined time interval is stopped and the congestion information is not been received until a predetermined time elapses. Note that congestion in the NW may occur, for example, in the server or in a network device such as an L2SW.

Figure 2:
FIG. 2 is a diagram illustrating a data configuration example of transmission-interval/chunk-loss correspondence information according to the embodiment.

Furthermore, when congestion occurs, the chunk loss determination unit 114 determines the packet transmission interval with reference to the transmission-interval/chunk-loss correspondence table 200 (FIG. 2).

FIG. 2 is a diagram illustrating a data configuration example of the transmission-interval/chunk-loss correspondence table 200 according to the present embodiment.

As illustrated in FIG. 2, in the transmission-interval/chunk-loss correspondence table 200, the chunk loss rates are stored in association with transmission intervals of the packets by the chunk loss determination unit 114.

For example, when the transmission interval is "100 (µs)", the chunk loss rate is "0(%)". When the transmission interval is "90 (µs)", the chunk loss rate is "5(%)".

The values in the transmission-interval/chunk-loss correspondence table 200 are information updated each time the chunk loss determination unit 114 calculates the chunk loss rate of the packets transmitted to the client terminal 20.

[Logic B]
(When congestion occurs) chunk loss rate (R_LOSS) >maximum allowable chunk loss rate (MAX_LOSS)

In this case, the chunk loss determination unit 114 sets a transmission interval corresponding to the chunk loss rate of "0" as the packet transmission interval in the transmission-interval/chunk-loss correspondence table 200 (FIG. 2). For example, in a case in which the maximum allowable chunk loss rate is "8(%)", the current transmission interval is "80 (µs)", and the current chunk loss rate is "15(%)", the transmission interval is set to "95 (µs)", which corresponds to the chunk loss rate of "0(%)".

Note that, in a case in which there are a plurality of transmission intervals corresponding to the chunk loss rate of "0(%)", one determination method is set from among selecting one having the shortest transmission interval, selecting one having the longest transmission interval, randomly selecting one, and the like.

Furthermore, in a case in which no transmission interval corresponding to the chunk loss rate of "0(%)" exists in the transmission-interval/chunk-loss correspondence table 200 at a certain time, the value of the transmission interval closest to the chunk loss rate of "0(%)" existing at that time is set. That is, the chunk loss determination unit 114 sets the transmission interval corresponding to the chunk loss rate of 0, or the transmission interval corresponding to the chunk loss rate closest to 0 in a case in which there is no transmission interval corresponding to the chunk loss rate of 0.

Furthermore, in a case in which the chunk loss rate (R_LOSS) exceeds the maximum allowable chunk loss rate (MAX_LOSS) even if the packets are transmitted at the longest transmission interval indicated in the transmission-interval/chunk-loss correspondence table 200, the packet transmission interval may be determined to a value obtained by lengthening the longest transmission interval by a predetermined constant (a3).

(When congestion occurs) chunk loss rate (R_LOSS) <maximum allowable chunk loss rate (MAX_LOSS)

In this case, the chunk loss determination unit 114 sets the packet transmission interval having the shortest transmission interval value within a range in which the chunk loss rate does not exceed the maximum allowable chunk loss rate in the transmission-interval/chunk-loss correspondence table 200 (FIG. 2). For example, in a case in which the maximum allowable chunk loss rate is "12(%)", the current transmission interval is "90 (µs)", and the current chunk loss rate is "5(%)", the transmission interval is set to "85 (µs)", which corresponds to the chunk loss rate of "10(%)".

Note that, in a case of determining that the congestion in the NW is resolved on the basis of the stop of the reception of the congestion information or the like, the chunk loss determination unit 114 discards, as an outlier, the correspondence information between the transmission interval and the chunk loss rate updated after the congestion occurrence in the transmission-interval/chunk-loss correspondence table 200 (FIG. 2).

In this way, the chunk loss determination unit 114 can determine a transmission interval corresponding to the normal state in which no congestion is occurring.

Returning to FIG. 1, the transmission control unit 115 executes transmission processing of the chunked video data 400 by using the information on the packet transmission interval determined by the chunk loss determination unit 114.

Figure 3:
FIG. 3 is a diagram illustrating an example of a packet (UDP packet) transmitted by a server according to the embodiment.

Specifically, as illustrated in the example of a UDP packet in FIG. 3, the transmission control unit 115 creates a socket, designates a destination IP address in an IP header, designates a UDP port number, stores the chunked video data 400 in a payload portion to generate a UDP packet, and transmits the UDP packet to the client terminal 20.

At the time of transmitting this packet, the transmission control unit 115 stores the transmission interval of the packets (UDP packets) in the transmission-interval/chunk-loss correspondence table 200. The transmission control unit 115 then counts the quantity of transmitted packets and stores the quantity in the storage unit 13. The transmission interval and the quantity of packets are used for calculating a chunk loss rate and updating the transmission-interval/chunk-loss correspondence table 200 by the chunk loss determination unit 114.

As described above, by controlling the transmission interval of the packets to which the chunked video data 400 is added, the server 10 can avoid a packet loss, a NW delay, and a decrease in throughput due to occurrence of burst traffic caused by a large data size in a case in which the video data is transmitted without compression. Furthermore, performing rendering processing or the like in the server 10 makes it possible to reduce power consumption and a calculation load of the client terminal 20.

<<Client-Side System (Client Terminal)>>

The client terminal 20 according to the present embodiment is described with reference to FIG. 1.

The client terminal 20 transmits, for example, input information such as a line of sight in an HMD to the server 10 to cause the server 10 to execute video rendering processing or the like requiring a large processing load, receives the generated video data 400, and displays the video data 400 on a display device such as a display. The client terminal 20 receives the video data 400 from the server 10 as the chunked video data 400, and transmits the chunk numbers of lost chunks (loss chunk numbers) to the server 10. The client terminal 20 includes the loss chunk numbers in an input information packet for transmitting the input information 300 and transmits the input information packet. As a result, as compared with a case in which the loss chunk numbers are transmitted by another separate packet, it is possible to suppress occurrence of a ms-order delay caused by occurrence of waiting due to contention between a plurality of packets in a hardware interruption. Note that the client terminal 20 may be a terminal that displays video data in real time, instead of the HMD, and may be, for example, a terminal that provides a service such as a game using a moving video.

The client terminal 20 includes a control unit 21, an input/output unit 22, and a storage unit 23.

The input/output unit 22 inputs and outputs information to and from the server 10, another device, or the like. For example, the input/output unit 22 transmits the input information packet to which the input information 300 is added, and receives the packets to which the chunked video data 400 is added.

The input/output unit 22 includes a communication interface that transmits and receives information via the communication line (NW), and an input/output interface that inputs information from a sensor device (not illustrated) and outputs information to an output device such as a monitor (not illustrated).

The storage unit 23 includes a hard disk, a flash memory, a RAM, or the like.

The storage unit 23 temporarily stores a program for causing each functional unit of the control unit 21 to operate and information necessary for processing performed by the control unit 21.

The control unit 21 supervises overall processing executed by the client terminal 20, and includes an input information acquisition unit 211, a chunk processing unit 212, a data output unit 213, and an input information transmission unit 214.

The input information acquisition unit 211 acquires information (input information 300 for rendering) from various sensors (line-of sight tracking sensor, triaxial acceleration sensor, gyro sensor, and the like) included in the client terminal 20 via the input/output unit 22. The input information acquisition unit 211 then outputs the acquired input information 300 to the input information transmission unit 214.

The chunk processing unit 212 receives the packets (FIG. 3) to which the chunked video data 400 is added from the server 10. The chunk processing unit 212 then arranges the chunks of each packet in order of chunk numbers and extracts the chunk numbers of lost chunks (loss chunk numbers).

The chunk processing unit 212 outputs the loss chunk numbers to the input information transmission unit 214, and outputs the video data 400 arranged in order of the chunk numbers to the data output unit 213.

The data output unit 213 decodes (restores) the video by using the chunked video data 400 arranged in order of the chunk numbers, and displays the video on a display device such as a display via the input/output unit 22.

The input information transmission unit 214 includes the input information 300 acquired from the input information acquisition unit 211 and the loss chunk numbers acquired from the chunk processing unit 212 in one packet and transmits the packet to the server 10.

Figure 4:
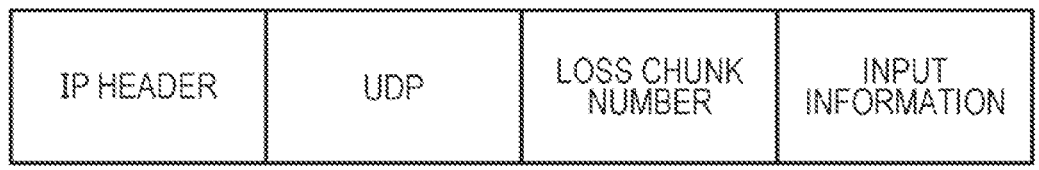
FIG. 4 is a diagram illustrating an example of a packet (UDP packet) transmitted by a client terminal according to the embodiment.

Specifically, as illustrated in the example of a UDP packet in FIG. 4, the input information transmission unit 214 creates a socket, designates a destination IP address in an IP header, designates a UDP port number, stores the loss chunk numbers and the input information 300 in a payload portion to generate a UDP packet, and transmits the UDP packet to the server 10.

Note that, during the initial operation when the chunked video data 400 is not received and in a case in which the chunk processing unit 212 extracts no loss chunk numbers, the input information transmission unit 214 does not include any loss chunk numbers but includes only the input information 300 in the UDP packet, and transmits the UDP packet to the server 10.

As described above, the client terminal 20 can display the video data 400 on a display device such as a display by decoding the chunked video data 400.

Furthermore, the client terminal 20 transmits the loss chunk numbers included in the packet of the input information 300 (input information packet) instead of an separate packet, so that it is possible to suppress occurrence of a delay due to a hardware interruption or the like.

<<Processing of Communication System>>

Next, processing executed by the communication system 1 is described.

Figure 5:
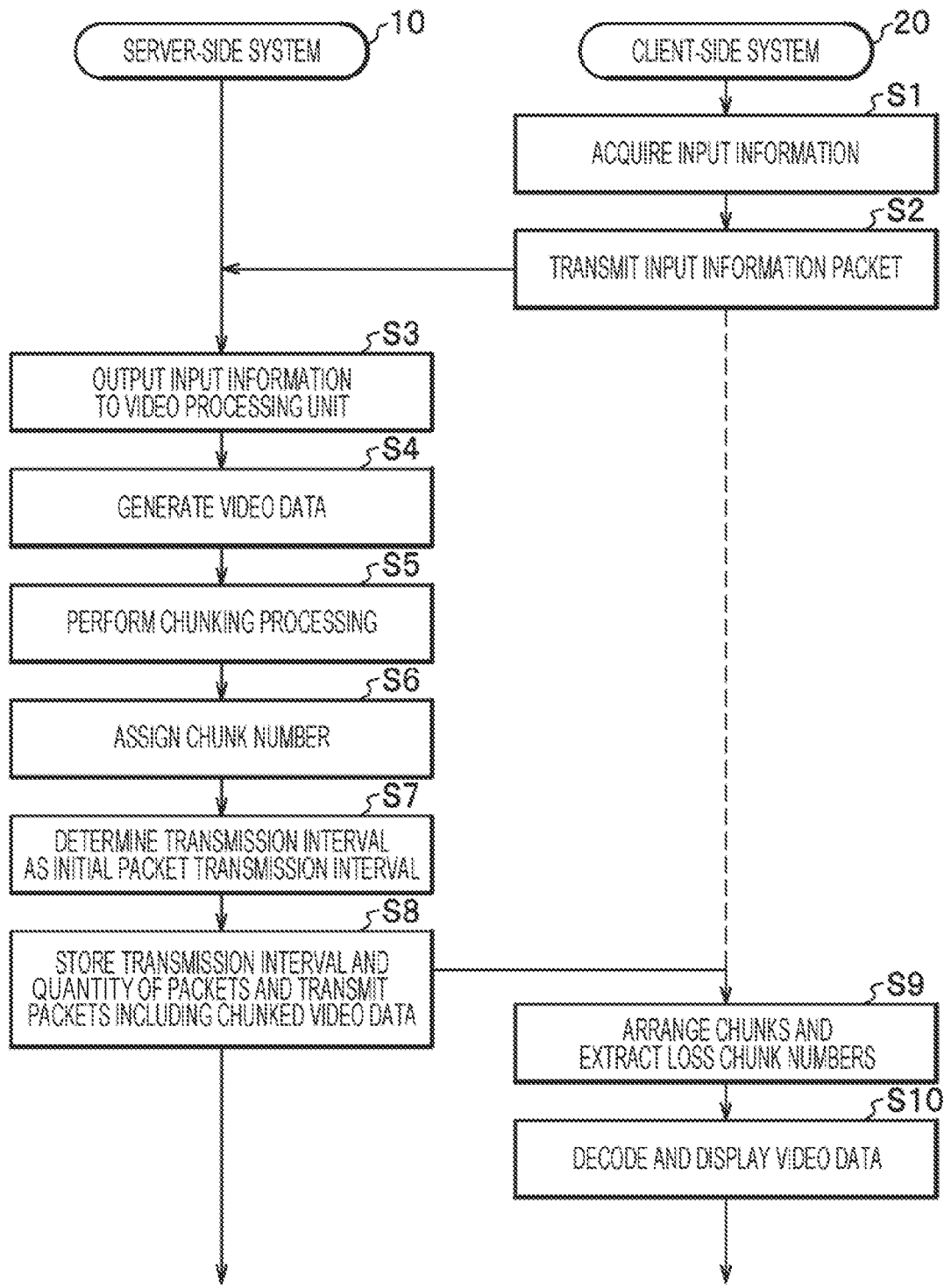
FIG. 5 is a sequence diagram illustrating a flow of processing (at an initial time) of the communication system according to the embodiment.
Figure 6:
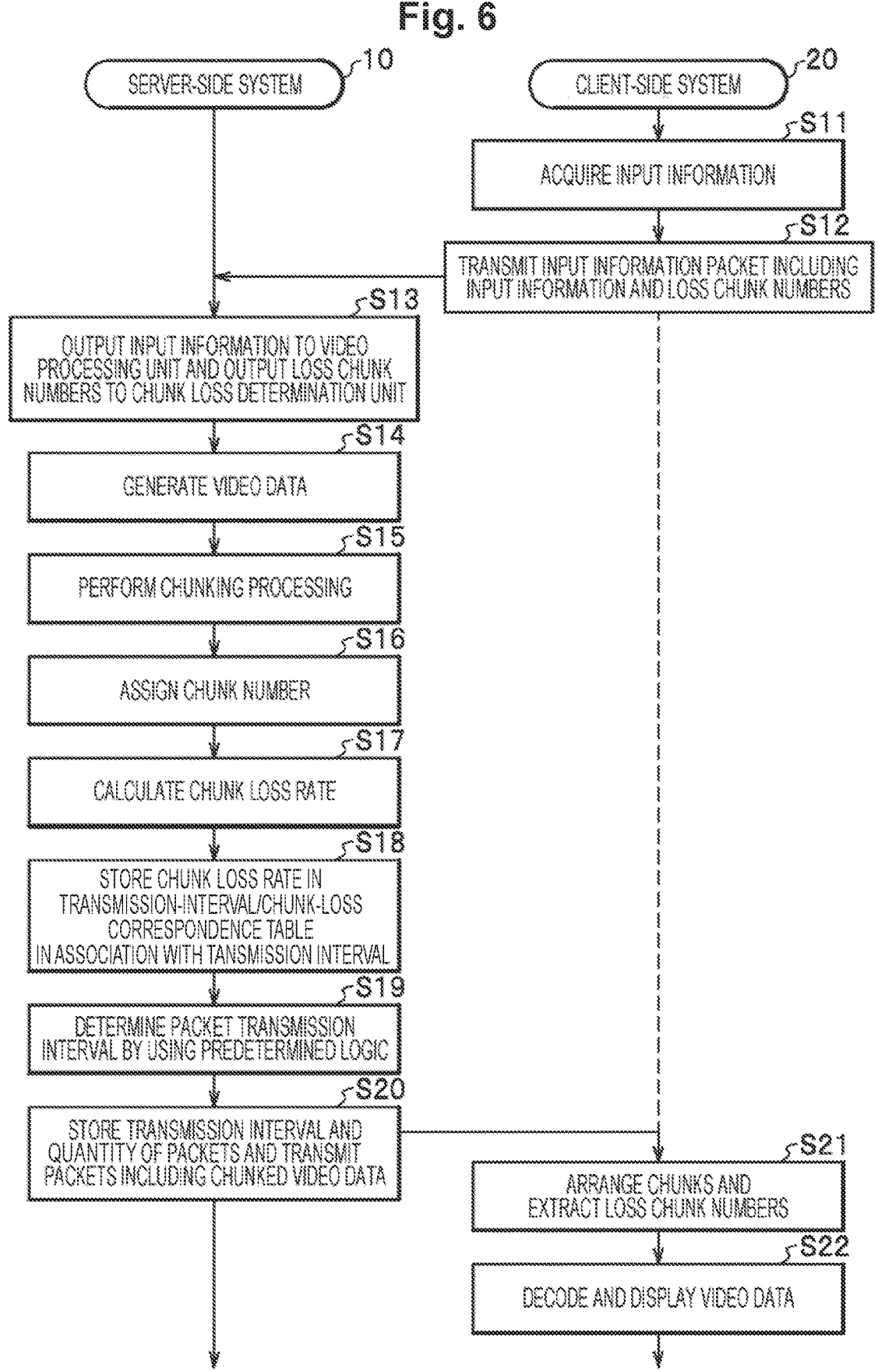
FIG. 6 is a sequence diagram illustrating the flow of the processing of the communication system according to the embodiment.

FIGS. 5 and 6 are sequence diagrams illustrating a flow of the processing of the communication system 1 according to the present embodiment.

First, as an initial (first) set of processing, the input information acquisition unit 211 of the client-side system (client terminal) 20 acquires the input information 300 from various sensors or the like (step S1).

Subsequently, the input information transmission unit 214 of the client terminal 20 generates a packet to which the input information 300 is added (input information packet), and transmits the packet to the server-side system (server) 10 (step S2).

Next, when receiving the input information packet, the information reception unit 111 of the server 10 outputs the input information 300 added to the packet to the video processing unit 112 (step S3).

The video processing unit 112 then refers to the image data DB 100 in the storage unit 13, performs video rendering processing according to the input information 300 to generate the video data 400 (step S4).

Subsequently, the chunking function unit 113 of the server 10 chunks the generated video data 400 according to the size of an MTU for each frame (step S5: chunking processing).

The chunking function unit 113 then assigns a chunk number to data of each chunk after chunking (step S6).

Next, the chunk loss determination unit 114 determines a transmission interval of a first set of the chunked video data 400 as an initial packet transmission interval, which is set in advance (step S7).

The transmission control unit 115 of the server 10 then generates packets including the chunked video data 400 and transmits the packets to the client terminal 20 at the initial packet transmission interval (step S8). At this time, the transmission control unit 115 stores the transmission interval determined as the initial packet transmission interval in the storage unit 13, counts the quantity of transmitted packets, and stores the quantity in the storage unit 13.

The chunk processing unit 212 of the client terminal 20 receives the packets (FIG. 3) to which the chunked video data 400 is added from the server 10, arranges the chunks of each packet in order of the chunk numbers, and extracts the chunk numbers of the lost chunks (loss chunk numbers) (step S9).

The chunk processing unit 212 then outputs the loss chunk numbers to the input information transmission unit 214, and outputs the video data 400 arranged in order of the chunk numbers to the data output unit 213.

The data output unit 213 of the client terminal 20 decodes (restores) the video by using the chunked video data 400 arranged in order of the chunk numbers, and displays the video on a display device such as a display via the input/output unit 22 (step S10).

The processing up to this step is the processing of the communication system 1 at the initial time.

Referring now to FIG. 6, in the second and subsequent sets of processing, the input information acquisition unit 211 of the client-side system (client terminal) 20 acquires the input information 300 from various sensors or the like (step S11).

Subsequently, the input information transmission unit 214 of the client terminal 20 generates a packet (input information packet (FIG. 4)) including the input information 300 acquired by the input information acquisition unit 211 in step S11 and the loss chunk numbers extracted by the chunk processing unit 212 in step S9 of FIG. 5, and transmits the packet to the server-side system (server) 10 (step S12).

Next, when receiving the input information packet, the information reception unit 111 of the server 10 outputs the input information 300 added to the input information packet to the video processing unit 112, and outputs the loss chunk numbers to the chunk loss determination unit 114 (step S13).

The video processing unit 112 then refers to the image data DB 100 in the storage unit 13, performs video rendering processing according to the input information 300 to generate the video data 400 (step S14).

Subsequently, the chunking function unit 113 of the server 10 chunks the generated video data 400 according to the size of the MTU for each frame (step S15: chunking processing).

The chunking function unit 113 then assigns a chunk number to data of each chunk after chunking (step S16).

Next, the chunk loss determination unit 114 of the server 10 calculates a chunk loss rate on the basis of the loss chunk numbers acquired in step S13 and the quantity of packets counted by the transmission control unit 115 in step S8 of FIG. 5 (step S17).

Subsequently, the chunk loss determination unit 114 stores the calculated chunk loss rate in the transmission-interval/chunk-loss correspondence table 200 (FIG. 2) in the storage unit 13 in association with the transmission interval at the time of transmission of the packets counted by the transmission control unit 115 (step S18).

The chunk loss determination unit 114 then determines a packet transmission interval at which the chunked video data 400 is transmitted by using a predetermined logic (transmission interval determination logic) based on the calculated chunk loss rate (step S19).

At this time, the chunk loss determination unit 114 compares the calculated chunk loss rate with the maximum allowable chunk loss rate on the basis of the transmission interval determination logic ([Logic A]), and controls an increase or decrease in the packet transmission interval. Furthermore, the chunk loss determination unit 114 determines whether congestion is occurring in the NW on the basis of whether congestion information of the NW is being received from a NW management device or the like. In a case in which the congestion is occurring, the chunk loss determination unit 114 determines the packet transmission interval at which the chunked video data 400 is transmitted on the basis of a transmission interval determination logic adapted to the case of congestion ([Logic B]).

The transmission control unit 115 of the server 10 then generates packets including the chunked video data 400 in step S15, and transmits the packets to the client terminal 20 at the packet transmission interval determined in step S19 (step S20). At this time, the transmission control unit 115 counts the quantity of transmitted packets, and stores the transmission interval at the time of transmitting the packets and the quantity of the transmitted packets in the storage unit 13.

Subsequently, the chunk processing unit 212 of the client terminal 20 receives the packets (FIG. 3) to which the chunked video data 400 is added from the server 10, arranges the chunks of the packets in order of the chunk numbers, and extracts the chunk numbers of lost chunks (loss chunk numbers) (step S21).

The chunk processing unit 212 then outputs the loss chunk numbers to the input information transmission unit 214, and outputs the video data 400 arranged in order of the chunk numbers to the data output unit 213.

The data output unit 213 of the client terminal 20 decodes (restores) the video by using the chunked video data 400 arranged in order of the chunk numbers, and displays the video on a display device such as a display via the input/output unit 22 (step S22).

Thereafter, the processing from step S11 is repeated.

<Hardware Configuration>

Figure 7:
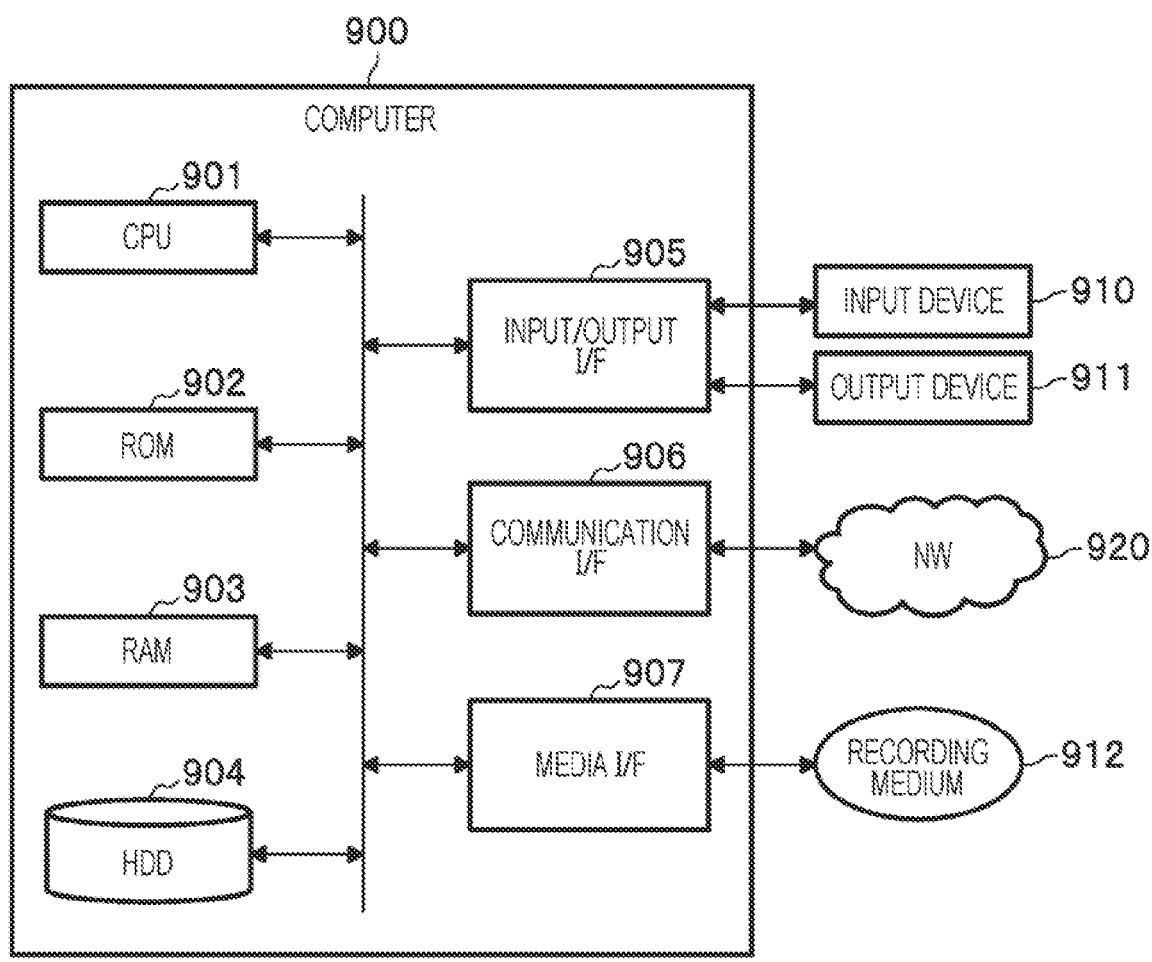
FIG. 7 is a hardware configuration diagram illustrating an example of a computer that implements functions of the server and the client terminal according to the embodiment.

Each of the server 10 and the client terminal 20 according to the present embodiment is implemented by, for example, a computer 900 having a configuration as illustrated in FIG. 7.

FIG. 7 is a hardware configuration diagram illustrating an example of the computer 900 that implements the functions of the server 10 and the client terminal 20 according to the present embodiment. The computer 900 includes a central processing unit (CPU) 901, a read-only memory (ROM) 902, a RAM 903, a hard disk drive (HDD) 904, an input/output interface (I/F) 905, a communication I/F 906, and a media I/F 907.

The CPU 901 operates on the basis of a program stored in the ROM 902 or the HDD 904, and performs control by the control units 11 and 21 (FIG. 1). The ROM 902 stores a boot program executed by the CPU 901 when the computer 900 is activated, a program related to hardware of the computer 900, and the like.

The CPU 901 controls an input device 910 such as a mouse or a keyboard and an output device 911 such as a display or a printer via the input/output I/F 905. The CPU 901 acquires data from the input device 910 and outputs generated data to the output device 911 via the input/output I/F 905.

The HDD 904 stores a program executed by the CPU 901, data used by the program, and the like. The communication I/F 906 receives data from another device via a communication network (for example, a NW 920), outputs the data to the CPU 901, and transmits data generated by the CPU 901 to another device via the communication network.

The media I/F 907 reads a program or data stored in a recording medium 912, and outputs the program or data to the CPU 901 via the RAM 903. The CPU 901 loads a program related to target processing from the recording medium 912 via the media I/F 907 onto the RAM 903, and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a semiconductor memory, or the like.

For example, in a case in which the computer 900 functions as the server 10 or the client terminal 20 of the present embodiment, the CPU 901 of the computer 900 implements the functions of the server 10 or the client terminal 20 by executing the program loaded onto the RAM 903. In addition, the HDD 904 stores data in the RAM 903. The CPU 901 reads the program related to the target processing from the recording medium 912, and executes the program. Additionally, the CPU 901 may read the program related to the target processing from another device via the communication network (NW 920).

<Effects>

Hereinafter, effects of the communication system and the like according to the embodiment of the present invention is described.

A communication system according to the present embodiment is a communication system 1 in which a server-side system 10 and a client-side system 20 are communicably connected via a network, the server-side system 10 including: an information reception unit 111 that receives, from the client-side system 20, an input information packet including input information 300 for rendering and loss chunk numbers, which are numbers of lost chunks in chunked video data; a video processing unit 112 that performs video rendering processing according to the received input information 300 to generate video data; a chunking function unit 113 that chunks the generated video data 400 according to a size of an MTU and assigns a number to each of chunks indicating the chunked video data 400; a chunk loss determination unit 114 that calculates a chunk loss rate by use of the quantity of packets with which the chunked video data 400 is transmitted and a total quantity of the lost chunks indicated by the loss chunk numbers, and determines a transmission interval of the packets including the chunked video data on the basis of a predetermined transmission interval determination logic for determining the transmission interval by comparing the calculated chunk loss rate with a preset maximum allowable chunk loss rate; and a transmission control unit 115 that transmits each of the packets including the chunked video data 400 to the client-side system 20 at the determined transmission interval, the client-side system 20 including: an input information acquisition unit 211 that acquires the input information 300; a chunk processing unit 212 that receives each of the packets including the chunked video data 400 from the server-side system 10 and extracts the loss chunk numbers of the chunks included in a lost packet; a data output unit 213 that decodes and outputs the video data 400 by use of each chunk of the received chunked video data 400; and an input information transmission unit 214 that transmits the input information packet including the input information 300 and the extracted loss chunk numbers to the server-side system 10.

As described above, the communication system 1 can reduce power consumption and a calculation load of the client-side system (client terminal) 20 by performing rendering processing and the like in the server-side system (server) 10. In addition, by controlling the transmission interval of the packets to which the chunked video data 400 is added, the communication system 1 can avoid a packet loss, a NW delay, and a decrease in throughput due to occurrence of burst traffic while transmitting the video data without compression.

Therefore, it is possible to reduce a processing load of the client-side system (client terminal) 20 and to eliminate the need to provide a high-performance processor or a dedicated accelerator on the user side.

Furthermore, in the communication system 1, the predetermined transmission interval determination logic lengthens the transmission interval by a predetermined first constant in a case in which the calculated chunk loss rate is larger than the maximum allowable chunk loss rate, and shortens the transmission interval by a predetermined second constant in a case in which the calculated chunk loss rate is smaller than the maximum allowable chunk loss rate.

As described above, according to the predetermined transmission interval determination logic, the server-side system (server) 10 of the communication system 1 can lengthen the transmission interval in the case in which the calculated chunk loss rate is larger than the maximum allowable chunk loss rate, and can shorten the transmission interval in the case in which the calculated chunk loss rate is smaller than the maximum allowable chunk loss rate.

Therefore, by repeating the determination of the transmission interval using the predetermined transmission interval determination logic, the communication system 1 can determine a more appropriate transmission interval of the packets within a range in which the chunk loss rate falls within the maximum allowable chunk loss rate or less.

Furthermore, in the communication system 1, the transmission control unit 115 stores the transmission interval at which each of the packets including the chunked video data 400 is transmitted, the chunk loss determination unit 114 stores, when calculating the chunk loss rate, the calculated chunk loss rate and the transmission interval at which the chunked video data is transmitted in association with each other as transmission-interval/chunk-loss correspondence table 200 in a storage unit, and uses, as the predetermined transmission interval determination logic, a transmission interval determination logic used in a case in which congestion information indicating that congestion is occurring in the network is received, and the transmission interval determination logic determines a transmission interval of the packets to be transmitted in a case in which the calculated chunk loss rate is larger than the maximum allowable chunk loss rate, by referring to the transmission-interval/chunk-loss correspondence table 200 and extracting a transmission interval corresponding to a chunk loss rate of 0 or a transmission interval corresponding to a chunk loss rate closest to 0 in a case in which there is no transmission interval corresponding to the chunk loss rate of 0, and determines a transmission interval of the packets to be transmitted in a case in which the calculated chunk loss rate is smaller than the maximum allowable chunk loss rate, by referring to the transmission-interval/chunk-loss correspondence table 200, and extracting a transmission interval having a shortest transmission interval within a range in which the calculated chunk loss rate does not exceed the maximum allowable chunk loss rate.

As described above, in a case in which congestion is occurring in the network, the server-side system (server) 10 of the communication system 1 can determine the transmission interval of the packets to be transmitted with the predetermined transmission interval determination logic.

With this transmission interval determination logic, when the calculated chunk loss rate is larger than the maximum allowable chunk loss rate, the server-side system (server) 10 can refer to the transmission-interval/chunk-loss correspondence table 200 (FIG. 2) and extract the transmission interval corresponding to the chunk loss rate of 0 or the transmission interval corresponding to the chunk loss rate closest to 0 in a case in which there is no transmission interval corresponding to the chunk loss rate of 0. Furthermore, when the calculated chunk loss rate is smaller than the maximum allowable chunk loss rate, the server-side system (server) 10 can refer to the transmission-interval/chunk-loss correspondence table 200 and extract the transmission interval having the shortest transmission interval within a range in which the calculated chunk loss rate does not exceed the maximum allowable chunk loss rate.

Therefore, the communication system 1 can determine a more appropriate transmission interval of the packets when congestion occurs.

A server according to the present embodiment is a server 10 that communicatively connects to a client terminal 20 via a network, the server 10 including: an information reception unit 111 that receives, from the client terminal 20, an input information packet including input information 300 for rendering and loss chunk numbers, which are numbers of lost chunks in chunked video data; a video processing unit 112 that performs video rendering processing according to the received input information 300 to generate video data 400; a chunking function unit 113 that chunks the generated video data 400 according to a size of an MTU and assigns a number to each of chunks indicating the chunked video data 400; a chunk loss determination unit 114 that calculates a chunk loss rate by use of the quantity of packets with which the chunked video data 400 is transmitted and a total quantity of the lost chunks indicated by the loss chunk numbers, and determines a transmission interval of the packets including the chunked video data 400 on the basis of a predetermined transmission interval determination logic for determining the transmission interval by comparing the calculated chunk loss rate with a preset maximum allowable chunk loss rate; and a transmission control unit 115 that transmits each of the packets including the chunked video data 400 to the client terminal 20 at the determined transmission interval.

With this configuration, the server 10 controls the transmission interval of the packets to which the chunked video data 400 is added, so that it is possible to avoid a packet loss, a NW delay, and a decrease in throughput due to occurrence of burst traffic while transmitting the video data without compression.

A client terminal according to the present embodiment is a client terminal 20 that communicatively connects to a server 10 via a network, the client terminal 20 including: an input information acquisition unit 211 that acquires input information 300 for rendering; a chunk processing unit 212 that receives each of packets including chunked video data 400 from the server 10 and extracts loss chunk numbers of chunks included in a lost packet; a data output unit 213 that decodes and outputs the video data 400 by use of each chunk of the received chunked video data 400; and an input information transmission unit 214 that transmits an input information packet including the input information 300 and the extracted loss chunk numbers to the server 10.

As described above, the client terminal 20 transmits the loss chunk numbers included in the packet of the input information 300 (input information packet) instead of an separate packet, so that it is possible to suppress occurrence of a delay due to a hardware interruption or the like.

Note that the present invention is not limited to the above-described embodiment, and many modifications can be made by those skilled in the art within the technical idea of the present invention.

REFERENCE SIGNS LIST

1 Communication system
10 Server-side system (server)
11, 21 Control unit
12, 22 Input/output unit
13, 23 Storage unit
20 Client-side system (client terminal)
100 Image data DB
111 Information reception unit
112 Video processing unit
113 Chunking function unit
114 Chunk loss determination unit
115 Transmission control unit
200 Transmission-interval/chunk-loss correspondence information
211 Input information acquisition unit
212 Chunk processing unit
213 Data output unit
214 Input information transmission unit
300 Input information
400 Video data.

The invention claimed is:

1. A communication system in which a server-side system and a client-side system are communicably connected via a network, the server-side system comprising:
a first processor configured to:
receive, from the client-side system, an input information packet including input information for rendering and loss chunk numbers, which are numbers of lost chunks in chunked video data;
perform video rendering processing according to the received input information to generate video data;
chunk the generated video data according to a size of a maximum transmission unit (MTU) and assign a number to each of chunks indicating the chunked video data;
calculate a chunk loss rate by use of a quantity of packets with which the chunked video data is transmitted and a total quantity of the lost chunks indicated by the loss chunk numbers, and determine a transmission interval of the packets including the chunked video data on a basis of a predetermined transmission interval determination logic, which
lengthens the transmission interval by a predetermined first constant in a case in which the calculated chunk loss rate is larger than a preset maximum allowable chunk loss rate, and
shortens the transmission interval by a predetermined second constant in a case in which the calculated chunk loss rate is smaller than the maximum allowable chunk loss rate; and
transmit each of the packets including the chunked video data to the client-side system at the determined transmission interval,
the client-side system comprising:
a second processor configured to:
acquire the input information;
receive each of the packets including the chunked video data from the server-side system and extract the loss chunk numbers of the chunks included in lost packets;
decode and output the video data by use of each chunk of the received chunked video data; and
transmit the input information packet including the input information and the extracted loss chunk numbers to the server-side system.

2. The communication system according to claim 1, wherein
the first processor is configured to store the transmission interval at which each of the packets including the chunked video data is transmitted,
store, when calculating the chunk loss rate, the calculated chunk loss rate and the transmission interval at which the chunked video data is transmitted in association with each other as transmission-interval/chunk-loss correspondence information in a storage unit, and on a basis of the predetermined transmission interval determination logic used in a case in which congestion information indicating that congestion is occurring in the network is received, determine a transmission interval of the packets to be transmitted in a case in which the calculated chunk loss rate is larger than the maximum allowable chunk loss rate, by referring to the transmission-interval/chunk-loss correspondence information and extracting a transmission interval corresponding to a chunk loss rate of 0 or a transmission interval corresponding to a chunk loss rate closest to 0 in a case in which there is no transmission interval corresponding to the chunk loss rate of 0, and determine a transmission interval of the packets to be transmitted in a case in which the calculated chunk loss rate is smaller than the maximum allowable chunk loss rate, by referring to the transmission-interval/chunk-loss correspondence information, and extracting a transmission interval being a shortest transmission interval within a range in which the calculated chunk loss rate does not exceed the maximum allowable chunk loss rate.

3. A communication method for a communication system in which a server-side system and a client-side system are communicably connected via a network, wherein the server-side system executes:

receiving, from the client-side system, an input information packet including input information for rendering and loss chunk numbers, which are numbers of lost chunks in chunked video data;

performing video rendering processing according to the received input information to generate video data;

chunking the generated video data according to a size of a maximum transmission unit (MTU) and assigning a number to each of chunks indicating the chunked video data;

calculating a chunk loss rate by use of a quantity of packets with which the chunked video data is transmitted and a total quantity of the lost chunks indicated by the loss chunk numbers, and determining a transmission interval of the packets including the chunked video data on a basis of a predetermined transmission interval determination logic, which lengthens the transmission interval by a predetermined first constant in a case in which the calculated chunk loss rate is larger than a preset maximum allowable chunk loss rate, and shortens the transmission interval by a predetermined second constant in a case in which the calculated chunk loss rate is smaller than the maximum allowable chunk loss rate; and transmitting each of the packets including the chunked video data to the client-side system at the determined transmission interval, and wherein the client-side system executes:

acquiring the input information;

receiving each of the packets including the chunked video data from the server-side system and extracting the loss chunk numbers of the chunks included in a lost packet;

decoding and outputting the video data by using each chunk of the received chunked video data; and transmitting the input information packet including the input information and the extracted loss chunk numbers to the server-side system.

4. A non-transitory computer-readable storage medium storing a program for causing a computer to function as the server-side system according to claim 3.

5. A server that communicatively connects to a client terminal via a network, the server comprising:

a processor configured to:

receive, from the client terminal, an input information packet including input information for rendering and loss chunk numbers, which are numbers of lost chunks in chunked video data;

perform video rendering processing according to the received input information to generate video data;

chunk the generated video data according to a size of a maximum transmission unit (MTU) and assign a number to each of chunks indicating the chunked video data;

calculate a chunk loss rate by use of the quantity of packets with which the chunked video data is transmitted and a total quantity of the lost chunks indicated by the loss chunk numbers, and determine a transmission interval of the packets including the chunked video data on a basis of a predetermined transmission interval determination logic, which lengthens the transmission interval by a predetermined first constant in a case in which the calculated chunk loss rate is larger than a preset maximum allowable chunk loss rate, and shortens the transmission interval by a predetermined second constant in a case in which the calculated chunk loss rate is smaller than the maximum allowable chunk loss rate; and transmit each of the packets including the chunked video data to the client terminal at the determined transmission interval.

* * * * *